Aug. 30, 1932.   T. J. LYNCH   1,875,248

TANK HOLDING ONE-RAIL TRUCK

Filed May 22, 1930

INVENTOR
Thomas J. Lynch
BY
Gardner W Pearson
ATTORNEY

Patented Aug. 30, 1932

1,875,248

UNITED STATES PATENT OFFICE

THOMAS J. LYNCH, OF LOWELL, MASSACHUSETTS, ASSIGNOR TO MARY C. BRENNAN, OF LOWELL, MASSACHUSETTS

TANK HOLDING ONE RAIL TRUCK

Application filed May 22, 1930. Serial No. 454,794.

This invention relates to trucks such as are used in railroad construction and repair work and which are made to run on a single rail. They are preferably of such character that they can quickly be dumped or removed from the rail to allow the passage of trains.

In the past they have been extensively used for carrying ties, rails and other similar material which can be laid upon a skeleton body and balanced longitudinally and laterally.

Such a truck has also been used to carry a material box which can be filled with dirt, crushed stone or other similar material and which preferably can be removed from the truck so that the truck can be used both for carrying filling as well as rails and ties.

This type of truck may be called a one rail truck as it includes a truck body of skeleton form in which or under which are mounted two grooved wheels positioned one behind the other.

Such a truck is usually provided with a handle attached to and extending up at an oblique angle from one side, which may be the inside between the rails, or the outside which is beyond the rails.

In modern railroad operations, it has become necessary or desirable to move heavy cylindrical tanks containing various gases under high pressure to be used in welding processes.

These tanks are heavy and being cylindrical are troublesome to transport unless they are stood upon their ends.

When transported on four wheel hand cars, tanks are not of such character that they can be thrown off to help clear the car when it is to be taken from the tracks to permit a train to pass. On the other hand, unless suitably fastened, such tanks cannot readily be transported on a one rail truck.

The purpose of this device is to provide a one rail truck so equipped that it can be used for transporting one or more gas tanks standing up on end and preferably so that the devices for holding the tank or tanks in place can be removed if desired so that the truck can be used for carrying rails, ties or a material box.

In the drawing, Fig. 1 is a perspective of a one rail truck standing on a rail with my tank holding device and with the tanks in position.

Figure 1:
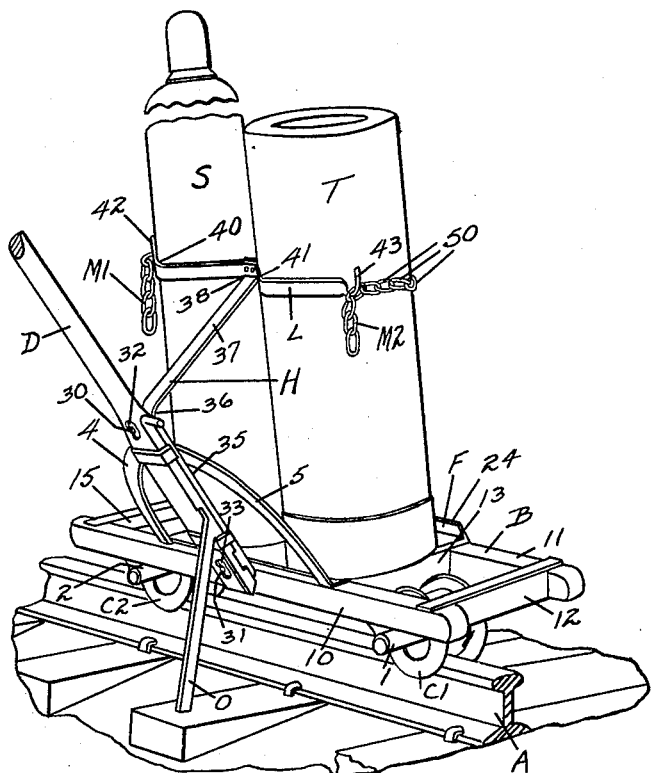
Figure 2:
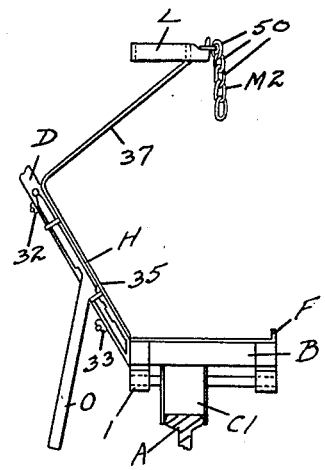
Fig. 2 is a front end elevation of a truck such as shown in Fig. 1 after the tanks have been removed.
Figure 3:
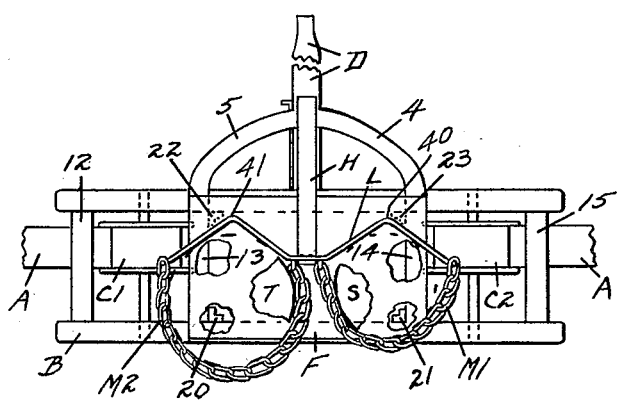
Fig. 3 is a plan view of the truck and tanks shown in Fig. 1 most of the tanks and part of the base plate being broken away to show the construction.

In the drawing, S and T represent two welding tanks of well known types one S being taller and of less diameter than the other T.

A represents a rail upon which the truck moves.

B is a skeleton body including the side bars 10 and 11 and the cross bars 12, 13, 14, 15 which are shown as of wood with suitable metal braces and fastened together in any suitable way.

This leaves a rectangular space between the side bars 10, 11 and the inside cross bars 13 and 14 over which the removable base plate F is positioned.

At the corners of a rectangle and so as to fit down into the corners of the rectangular space just described, angle irons 20, 21, 22, 23 are fastened under plate F so that they will fit snugly in each corner and prevent the base plate F from moving or slipping out of place.

Preferably the outside edge 24 of base plate F is upturned to prevent the bottom of the tanks S or T from slipping off.

Body B is supported by flanged wheels C1 and C2 carried by arbors 1 and 2 fastened underneath body B, and, as shown, in a position where the wheels extend up in between the side bars at the front and back.

D is a handle attached to side bar 10 of body B so as to extend up at an oblique angle from about the middle of that side.

As shown, it is braced on each side by braces 4 and 5 and is provided with a slidable leg O such as shown and described in application for Letters Patent on leg for one rail truck filed by me March 28, 1930, Serial No. 439,561.

This leg is provided so that the truck and tanks can be held upright on the rail or off the rail whenever desired.

H is a bracket arm shown as being made of flat metal detachably attached to handle D preferably by means of two bolts 30 and 31 which extend through suitable holes and have on the outside winged nuts 32 and 33 whereby the whole bracket arm can be removed when desired.

This bracket arm H is flat where it extends at 35 along handle D and is then bent at 36 to form a right angled branch 37 upturned at 38 where it is fastened to and supports cross bar L.

Cross bar L as shown is also made of flat metal and is bent outward at an angle on each side of bracket H, as shown at 40 and 41, and each end terminates in an upturned hook 42 or 43.

M1 and M2 are chains each attached at one end to the middle of the cross bar L, each being formed of links 50, 50, preferably each of which is of such size and shape that it is adapted to be slipped over one of the hooks 42 or 43 as shown in Fig. 1.

By making the bends on each side of the cross bar L of angular form, and using such adjusting chains, tanks of any diameter can be firmly held in place and can also be quickly removed if necessary.

Figure 4:
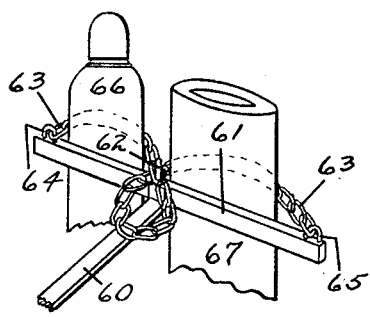
Fig. 4 is a perspective showing the detail of a modified type of cross bar and flexible member.

However, as shown in Fig. 4, I can use a cross bar 61 medially supported by an arm 60 which is substantially similar to H with a flexible member shown as a chain 63 fastened at each end 64 and 65 to the ends of cross bar 61.

By using a hook or finger 62 which projects upward from near the middle of arm 60, tanks of different sizes such as 66 and 67 can be encircled and the chain can be tightened on them by passing different links over hook 62.

I claim:

1. The combination with a one rail truck having a skeleton body comprising parallel side bars and cross bars which connect them, said body being supported by two grooved wheels positioned one behind the other and having a handle attached to and extending up at an oblique angle from one side; of a base plate detachably supported on the top of the body and having an upturned outside edge; a bracket arm detachably attached to the handle and extending therefrom towards and above the body; and a cross bar medially supported by said arm, said cross bar being bent on each side, and terminating at each end in a hook; together with two chains each of which is attached at one end to the middle of the cross bar, each chain being formed of links some of which are adapted to engage a hook.

2. The combination with a one rail truck having a skeleton body comprising parallel side bars and cross bars which connect them, said body being supported by two grooved wheels positioned one behind the other and having a handle attached to and extending up at an oblique angle from one side; of a base plate supported on the top of the body; a bracket arm detachably attached to the handle and extending therefrom towards and above the body; and a cross bar medially supported by said arm, said cross bar being bent on each side, and terminating at each end in a hook; together with two chains each of which is attached at one end to the middle of the cross bar.

3. The combination with a one rail truck having a body supported by two grooved wheels positioned one behind the other and having a handle attached to and extending up at an oblique angle from one side; of a bracket arm detachably attached to the handle and extending therefrom towards and above the body; and a cross bar medially supported by said arm, said cross bar being bent on each side, and terminating at each end in a hook; together with two chains each of which is attached at one end to the middle of the cross bar, each chain being formed of links some of which are adapted to engage a hook.

THOMAS J. LYNCH.